United States Patent
Friday et al.

(10) Patent No.: US 12,169,589 B1
(45) Date of Patent: Dec. 17, 2024

(54) APPARATUS AND METHODS RELYING ON NON-FLASHABLE CIRCUITRY FOR IMPROVING SECURITY FOR A SYSTEM CONNECTED TO A PUBLIC OR PRIVATE NETWORK

(71) Applicant: ZECURITY, LLC, Houston, TX (US)

(72) Inventors: Victor Bryan Friday, Houston, TX (US); David Lee Ronn, Houston, TX (US)

(73) Assignee: ZECURITY, LLC, Houston, TX (US)

( * ) Notice: Subject to any disclaimer, the term of this patent is extended or adjusted under 35 U.S.C. 154(b) by 0 days.

(21) Appl. No.: 18/367,943

(22) Filed: Sep. 13, 2023

(51) Int. Cl.
  *G06F 21/87* (2013.01)
  *G06F 21/62* (2013.01)
  *H04L 67/06* (2022.01)

(52) U.S. Cl.
  CPC ............ G06F 21/87 (2013.01); G06F 21/629 (2013.01); H04L 67/06 (2013.01)

(58) Field of Classification Search
  CPC ............... H04L 63/145; H04L 63/0464; H04L 63/0428; H04L 67/06; G06F 21/566; G06F 21/554; G06F 21/87; G06F 21/629
  (Continued)

(56) References Cited

U.S. PATENT DOCUMENTS

| | | | |
|---|---|---|---|
| 5,720,032 A * | 2/1998 | Picazo, Jr. ............... | H04L 49/90 709/213 |
| 6,427,173 B1 * | 7/2002 | Boucher .................. | H04L 67/62 709/250 |

(Continued)

FOREIGN PATENT DOCUMENTS

| | | | |
|---|---|---|---|
| CN | 103838670 A | * | 6/2014 |
| GB | 2441909 A | | 3/2008 |

(Continued)

OTHER PUBLICATIONS

Al-Qudah, Zakaria, Eamon Johnson, Michael Rabinovich, and Oliver Spatscheck. "Internet with transient destination-controlled addressing." IEEE/ACM Transactions on Networking 24, No. 2 (2014): 731-744. (Year: 2014).*

(Continued)

*Primary Examiner* — Luu T Pham
*Assistant Examiner* — Walter J Malinowski
(74) *Attorney, Agent, or Firm* — Porter Hedges LLP; Pierre Campanac; Jonathan Pierce

(57) ABSTRACT

A hardware unit relies on non-flashable circuitry for improving security for a system connected to a public or private network. The hardware unit can be added to a network without substantial modifications to the other devices already connected to the network. The hardware unit includes a switch that has at least two positions. In one of the two positions, the hardware unit detects and blocks or drops data packets or frames that contain an instruction of a known file-sharing protocol other than a reading instruction when the instruction is not addressed to a runtime file but transmits all the data packets or frames when the instruction is addressed to a runtime file. Thus, a cyber attack may be prevented instantaneously by what it attempts to do, typically the creation, insertion, deletion, update, renaming, or writing of files to compromise code or data while retaining the usual browser functionality.

12 Claims, 1 Drawing Sheet

(58) Field of Classification Search
USPC .......................................................... 726/26
See application file for complete search history.

(56) References Cited

U.S. PATENT DOCUMENTS

| | | | | |
|---|---|---|---|---|
| 6,438,130 | B1* | 8/2002 | Kagan | H04L 49/351 |
| | | | | 398/48 |
| 6,453,353 | B1* | 9/2002 | Win | H04L 63/105 |
| | | | | 726/8 |
| 6,631,453 | B1 | 10/2003 | Friday | |
| 6,763,015 | B1* | 7/2004 | Phillips | H04W 88/06 |
| | | | | 370/347 |
| 6,937,574 | B1* | 8/2005 | Delaney | H04L 61/5007 |
| | | | | 370/254 |
| 7,426,599 | B2 | 9/2008 | Yancey | |
| 7,808,995 | B2 | 10/2010 | Kuo | |
| 9,848,005 | B2 | 12/2017 | Ardeli | |
| 2004/0062305 | A1* | 4/2004 | Dambrackas | H04N 19/593 |
| | | | | 375/E7.178 |
| 2004/0103218 | A1* | 5/2004 | Blumrich | H05K 7/20836 |
| | | | | 709/249 |
| 2005/0169270 | A1 | 8/2005 | Mutou | |
| 2006/0041889 | A1* | 2/2006 | Radulescu | H04L 49/9073 |
| | | | | 719/313 |
| 2006/0253903 | A1* | 11/2006 | Krumel | H04L 63/0227 |
| | | | | 726/13 |
| 2007/0188607 | A1* | 8/2007 | Jia | H04N 19/503 |
| | | | | 348/E7.015 |
| 2008/0132288 | A1* | 6/2008 | Misawa | H04M 1/0235 |
| | | | | 455/566 |
| 2008/0137854 | A1 | 6/2008 | Friday | |
| 2008/0279166 | A1 | 11/2008 | Carty | |
| 2009/0063665 | A1* | 3/2009 | Bagepalli | H04L 63/02 |
| | | | | 710/100 |
| 2010/0061263 | A1 | 3/2010 | Breeding | |
| 2010/0169964 | A1 | 7/2010 | Liu | |
| 2010/0174608 | A1 | 7/2010 | Harkness | |
| 2011/0142426 | A1* | 6/2011 | Sasaki | G11B 20/1251 |
| | | | | 386/337 |
| 2012/0182891 | A1 | 7/2012 | Lee | |
| 2012/0240185 | A1* | 9/2012 | Kapoor | H04L 41/0866 |
| | | | | 726/1 |
| 2012/0254123 | A1* | 10/2012 | Ferguson | G06F 16/128 |
| | | | | 707/649 |
| 2013/0275228 | A1* | 10/2013 | Milazzo | G06Q 30/0269 |
| | | | | 705/14.66 |
| 2014/0115705 | A1* | 4/2014 | Fujishima | H04L 43/18 |
| | | | | 726/23 |
| 2014/0269697 | A1* | 9/2014 | Salys | H04L 47/80 |
| | | | | 370/389 |
| 2014/0286174 | A1* | 9/2014 | Iizuka | H04L 43/12 |
| | | | | 370/241 |
| 2014/0328249 | A1* | 11/2014 | Vermani | H04L 69/323 |
| | | | | 370/328 |
| 2015/0271755 | A1* | 9/2015 | Karri | H04W 28/0221 |
| | | | | 370/252 |
| 2015/0350095 | A1* | 12/2015 | Raney | H04L 43/00 |
| | | | | 709/223 |
| 2017/0250869 | A1* | 8/2017 | Voellmy | H04L 43/14 |
| 2019/0313160 | A1* | 10/2019 | Stokking | H04N 21/6587 |
| 2019/0379736 | A1* | 12/2019 | Kravtsov | H04L 69/22 |
| 2020/0004962 | A1 | 1/2020 | Araujo et al. | |
| 2020/0293487 | A1* | 9/2020 | Anderson | H04L 9/3263 |
| 2021/0067534 | A1 | 3/2021 | Mi | |
| 2021/0152860 | A1 | 5/2021 | Patro | |
| 2021/0226899 | A1 | 7/2021 | Kanurakaran | |
| 2021/0377029 | A1 | 12/2021 | Sloane | |
| 2022/0272039 | A1* | 8/2022 | Cardona | G06F 9/455 |
| 2023/0117644 | A1 | 4/2023 | Kamisetty | |
| 2023/0205715 | A1 | 6/2023 | Harris | |
| 2023/0362284 | A1* | 11/2023 | Waskiewicz, Jr. | H04L 69/22 |
| 2024/0022638 | A1 | 1/2024 | Wang | |

FOREIGN PATENT DOCUMENTS

| | | | | |
|---|---|---|---|---|
| WO | 2001075595 | A2 | 10/2001 | |
| WO | 2003067810 | A1 | 8/2003 | |
| WO | 2004102326 | A2 | 11/2004 | |
| WO | WO-2016117302 | A1 * | 7/2016 | H04L 43/00 |
| WO | 2016015981 | A2 | 10/2016 | |
| WO | WO-2021001944 | A1 * | 1/2021 | |

OTHER PUBLICATIONS

Shantharama, Prateek, Akhilesh S. Thyagaturu, and Martin Reisslein. "Hardware-accelerated platforms and infrastructures for network functions: A survey of enabling technologies and research studies." IEEE Access 8 (2020): 132021-132085. (Year: 2020).*

Maheshwari, Piyush. "Enterprise application integration using a component-based architecture." In Proceedings 27th Annual International Computer Software and Applications Conference. COMPAC 2003, pp. 557-562. IEEE, 2003. (Year: 2003).*

Tschudin, Christian, Henrik Lundgren, and Henrik Gulbrandsen. "Active routing for ad hoc networks." IEEE Communications Magazine 38, No. 4 (2000): 122-127. (Year: 2000).*

* cited by examiner

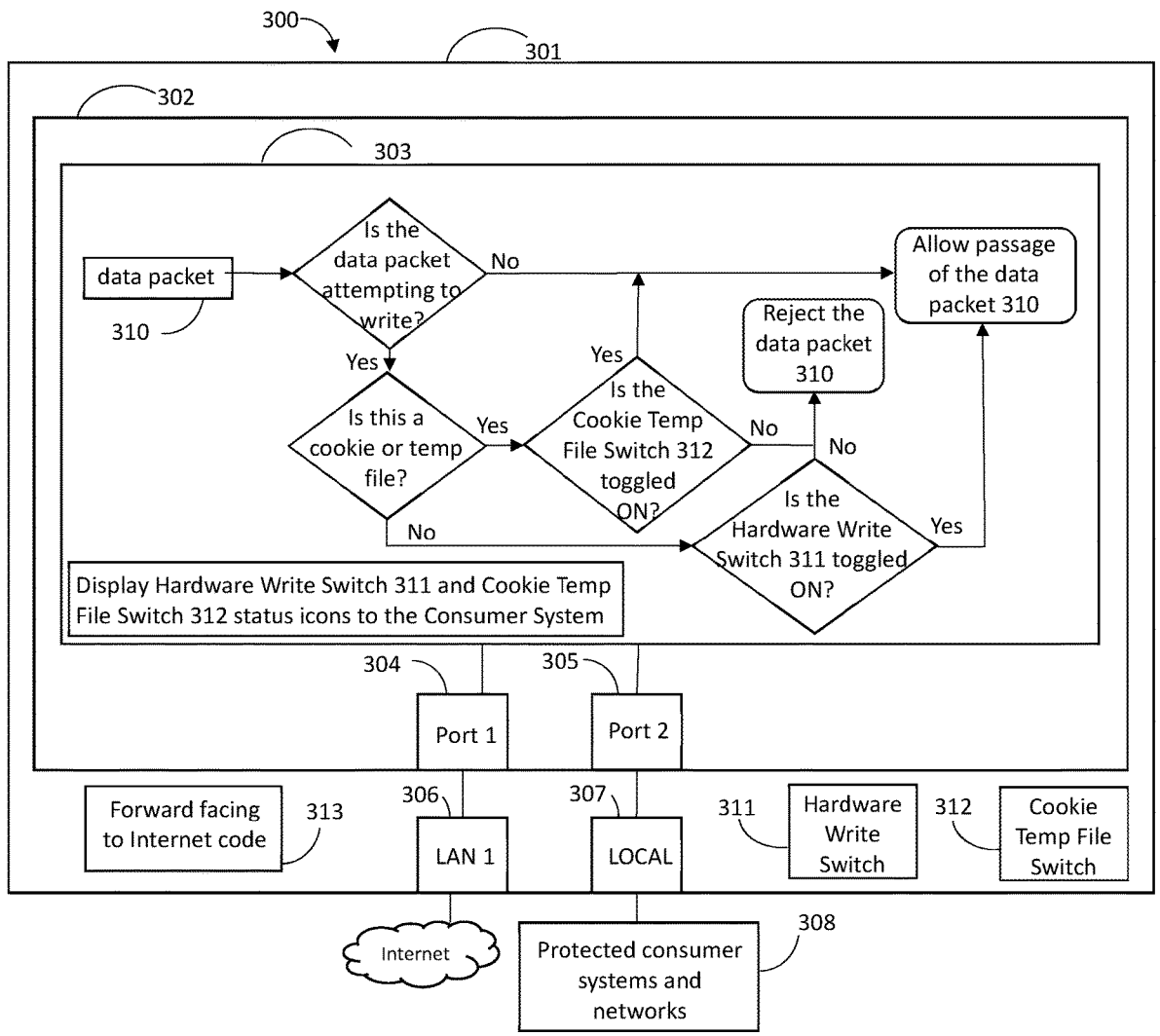

APPARATUS AND METHODS RELYING ON NON-FLASHABLE CIRCUITRY FOR IMPROVING SECURITY FOR A SYSTEM CONNECTED TO A PUBLIC OR PRIVATE NETWORK

CROSS-REFERENCE TO RELATED APPLICATIONS

None.

FIELD OF THE INVENTION

This disclosure relates generally to apparatus and methods for improving security for a system connected to a public or private network, such as detecting and/or preventing the unauthorized creation, insertion, deletion, update, or writing of files. This disclosure relates more particularly to apparatus and methods that rely on non-flashable circuitry, in contrast to software, for screening data packets or frames coming from public or private networks, and thus offer added protection against hackers or other unauthorized users.

BACKGROUND OF THE INVENTION

Security on networks is usually provided by software. However, software can be altered by hackers or other unauthorized users. As such, software, regardless of its level of sophistication, may have an inherent weakness compared to non-flashable circuitry.

An example of a secure data storage device on a private or public network is described in U.S. Pat. No. 6,631,453 issued on Oct. 7, 2003. This patent reference discloses a data storage/transmission hardware device (or multiple devices physically linked together) with two (or more) connectors. One of the connectors allows for the reading and writing of information (referred to as the "active channel") while the other connector(s) (referred to as "passive channels") allow solely for the reading of information. The actual limitation of "write" access of the passive connectors is brought about by a combination of hardware and firmware.

Security threats are often presented by cyber-attacks where a hacker or other unauthorized user creates, inserts, deletes, updates, renames, or writes computer files remotely by sending data packets or frames via private or public networks. The data packets or frames sent by the hacker or other unauthorized user are usually detected by firewall software and discarded. However, firewalls are an incomplete stopgap solution as they are still vulnerable due to their software nature and unreliable to protect against cyber-attacks as they require constant updating from trained personnel. Even with that updating, they still may not be able to keep up with the flow of new malware. As such, firewall software may not be sufficient.

In view of the foregoing, there is still a need in the art for apparatus and methods for improving security for a system connected to a public or private networks, such as by detecting and/or preventing the unauthorized creation, modification by data insertion, deletion, renaming, writing, or updating of files. Preferably, these apparatus and methods rely on non-flashable circuitry, in contrast to software, for improving security.

SUMMARY

The disclosure describes an apparatus for providing protection for a system connected to a private or public network. As used herein, a system may refer to a device or a set of connected devices and any software contained on those devices.

The apparatus comprises an enclosure having at least first and second connections, one or more switch(es) preferably mounted on the enclosure and collectively having a plurality of positions, and non-flashable circuitry located in the enclosure. As used herein, non-flashable circuitry is such that firmware implemented on non-flashable circuitry cannot be altered or updated from a remote location.

In use, the non-flashable circuitry is connected to the private or public network via the first connection and to the system via the second connection. The non-flashable circuitry is configured to receive data packets or frames from the private or public network via the first connection.

The one or more switches may be used by a user to select a mode of the apparatus. As used herein, a mode of the apparatus refers to a specific way the apparatus functions. Thus, the way the apparatus functions can be changed.

When the switches are collectively in a first predetermined position (e.g., the user has selected a browsing mode), embedded firmware causes the non-flashable circuitry to discard the data packets or frames when the data packets or frames contain the instruction other than the reading instruction, and the instruction is not addressed to a runtime file, and to transmit the data packets or frames to the system via the second connection when the instruction is addressed to a runtime file. As used herein, a runtime file is any file used to run a browser. Example of runtime files include, but are not limited to, temp or cookie files.

Optionally, when the switches are collectively in a second predetermined position (e.g., the user has selected a safe mode), the embedded firmware causes the non-flashable circuitry to discard the data packets or frames when the data packets or frames contain the instruction other than the reading instruction; and to transmit the data packets or frames to the system via the second connection when the instruction is a reading instruction.

Optionally, when the switches are collectively in a third predetermined position (e.g., the user has selected a full mode), the embedded firmware causes the non-flashable circuitry to transmit all the data packets or frames to the system via the second connection.

Preferably, the non-flashable circuitry is further configured to receive other data packets or frames from the system via the second connection. The embedded firmware causes the non-flashable circuitry to transmit the other data packets or frames to the public or private network via the first connection or via an optional third connection provided on the enclosure and connected to the non-flashable circuitry.

A method for providing protection for a system connected to a private or public network is also described.

BRIEF DESCRIPTION OF THE DRAWINGS

For a more detailed description of the embodiments of the disclosure, reference will now be made to the accompanying drawings, wherein:

FIG. 1 is a block diagram of a system, wherein the system includes a hardware unit relying on non-flashable circuitry for providing protection for a system connected to a public or private network, typically against cyber attacks.

DETAILED DESCRIPTION

This disclosure describes hardware units that rely on non-flashable circuitry (e.g., Application-Specific Integrated Circuits (ASICs), Field-Programmable Gate Arrays (FPGAs), or permanent Read-Only Memory (ROM) chips, or other burnable circuitry) for improving security on a public or private network. These hardware units can be added to a network without substantial modifications to the other devices already connected to the network. These hardware units detect and block or drop data packets or frames that contain an instruction of a known file-sharing protocol other than a reading instruction. Examples of known file-sharing protocols include, but are not limited to, the Server Message Block (SMB) protocol, the Network File System (NFS) protocol, the Apple Filing Protocol (AFP), or other protocols that may be developed in the future and are known at the time the apparatus are manufactured and/or in use. Examples of instructions other than a reading instruction include, but are not limited to, instructions to create a file, insert data in a file, delete a file, rename a file, update or write on a file. Thus, a cyber attack or unauthorized access may be detected instantaneously by what it attempts to do, typically the creation, insertion, deletion, update, renaming, or writing of files.

FIG. 1 is a block diagram of a hardware unit 300 which protects other computer systems and networks from cyber attacks without using conventional means or identity algorithms to do so.

The hardware unit 300 includes an enclosure 301. The hardware unit 300 contains a motherboard 302 which controls the operation of the hardware unit 300. The motherboard 302 contains the embedded firmware 303 which uses logic for the hardware unit 300 and controls the behavior of the hardware unit 300 for reading via an external port configured as read-only. The firmware 303 is designated as non-flashable memory where the firmware 303 cannot be updated from a remote location.

The motherboard 302 contains two interfaces or ports: Port1 304 and Port2 305. The hardware unit 300 contains two wired or wireless connections: LAN1 306 and LOCAL 307. Port1 304 is connected to LAN1 306. LAN1 306 can be directly connected as an Ethernet port, or it can be connected to an Ethernet to WIFI adapter. Port2 305 is connected to LOCAL 307 which is externally connected to the consumer systems and networks 308.

The hardware unit 300 contains forward facing to internet code 313 which allows connections on LAN 1 306 directly to the internet/cloud if needed.

In order to protect the consumer systems and networks 308 from cyber attacks by the hardware unit 300, the firmware 303 contains embedded logic to process a data packet 310 received through LAN1 306 and Port1 304. The hardware unit 300 contains a Hardware Write Switch 311, which controls the embedded logic to allow or reject write commands contained in the data packet 310, or more generally, whether the data packet 310 contains a command of a known file-sharing protocol other than a reading command, which may be a command to create, insert data, delete, rename, update or write. The hardware unit 300 contains a Cookie Temp File Switch 312, which controls the embedded logic to process a data packet 310 to allow or reject write commands contained in the data packet 310 for runtime files (e.g., cookie or temp files) or more generally, any command of a known file-sharing protocol contained in the data packet 310 for runtime files. The embedded logic constantly displays the Hardware Write Switch status and the Cookie Temp File Switch status to the consumer systems and networks 308. This status will be equivalent to toggled on or toggled off.

In use, the data packet 310 enters the hardware unit 300 through LAN1 306 and Port1 304, attempting to gain access to the protected consumer systems and networks 308. The embedded logic first checks the data packet 310 to determine if the data packet 310 is trying to write on a file or, more generally, execute commands other than a reading command.

a) If not, then the embedded logic allows the passage of the data packet 310.

b) If the data packet 310 is trying to write or, more generally, execute commands other than a reading instruction, then the embedded logic makes an additional check to see if the data packet 310 is for a runtime file.

b1) If the data packet 310 is not for a runtime file, then the embedded logic checks to see if the Hardware Write Switch 311 is toggled on.

b1i) If the Hardware Write Switch 311 is toggled on, the embedded logic allows passage of the data packet 310.

b1ii) If the Hardware Write Switch 311 is toggled off, then the embedded logic rejects (e.g., drops or blocks) the data packet 310.

b2) If the data packet 310 is for a runtime file, then the embedded logic checks to see if the Cookie Temp File Switch 312 is toggled on.

b2i) If the Cookie Temp File Switch 312 is toggled on, the embedded logic allows passage of the data packet 310.

b2ii) If the Cookie Temp File Switch 312 is toggled off, then the embedded logic rejects (e.g., drops or blocks) the data packet 310.

When the Hardware Write Switch 311 is toggled off and the Cookie Temp File Switch 312 is toggled on (i.e., the switches 311 and 312 are collectively in a first predetermined position), users of the consumer systems and networks 308 can utilize the Internet or the LAN to access remote resources with a low risk of cyber attacks because all attempts to execute of any command other than a reading command on a file other than a runtime file hosted by the consumer systems and networks 308 are blocked. In particular, users can use a browser with the usual functionality.

When the Hardware Write Switch 311 and the Cookie Temp File Switch 312 are toggled off (i.e., the switches 311 and 312 are collectively in a second predetermined position), users of the consumer systems and networks 308 can utilize the Internet or the LAN to access remote resources without the risk of cyber attacks because all attempts to execute of any command other than a reading command on a file hosted by the consumer systems and networks 308 are blocked.

When the Hardware Write Switch 311 and the Cookie Temp File Switch 312 are toggled on (i.e., the switches 311 and 312 are collectively in a third predetermined position), users of the consumer systems and networks 308 can utilize the Internet or the LAN to access remote resources without restriction, and thus can, for example, download files or data on the consumer systems and networks 308. Once the desired files or data are downloaded, the Hardware Write Switch 311 would typically be toggled back on.

While a Hardware Write Switch 311 and a Cookie Temp File Switch 312 both having two positions are described, alternatively, a single switch having three or more positions may be used.

In addition to the foregoing, the disclosure also contemplates at least the following embodiments. It should be noted that any element of any embodiments 1-11 may further include details related to this element that are disclosed in a paragraph or FIGURE describing the preferred embodiments without including details of other elements that are disclosed in the same or other paragraph or FIGURE.

Embodiment 1

Embodiment 1 is an apparatus for providing protection for a system connected to a public or private network. The apparatus comprises an enclosure, one or more switch(es) having collectively a plurality of positions, and non-flashable circuitry located in the enclosure. The one or more switch(es) may be mounted on the enclosure, on any device that is part or an entirety of the system, or stand-alone. The one or more switch(es) are connected to the non-flashable circuitry via wired or wireless connections.

The enclosure has at least first and second connections, which are either wired or wireless. The non-flashable circuitry is connectable to the public or private network via the first connection. The non-flashable circuitry is also connectable to the system via the second connection.

The non-flashable circuitry is configured to:
determine whether the one or more switch(es) are collectively in a first predetermined position, the data packets or frames contain an instruction of a known file-sharing protocol other than a reading instruction, and the instruction is not addressed to a runtime file,
discard the data packets or frames when the one or more switch(es) are collectively in the first predetermined position, the data packets or frames contain the instruction other than the reading instruction, and the instruction is not addressed to a runtime file, and
transmit the data packets or frames to the system via the second connection when the one or more switch(es) are collectively in the first predetermined position, and the instruction is addressed to a runtime file.

Thus, when the one or more switch(es) are collectively in the first position, the apparatus may protect the system from a cyber attack while retaining the usual browser functionality provided by runtime files. The cyber attack is prevented instantaneously by what it attempts to do, typically the creation, insertion, deletion, update, renaming, or writing of files to compromise code or data.

Determining whether the one or more switch(es) are collectively in the first predetermined position may involve determining the position of each of the switches.

Determining whether the first data packets or frames contain the instruction other than the reading instruction may involve testing whether the data packets or frames contain any of an instruction to either create a file, insert data in a file, delete a file, update a file, rename a file, or write on a file. In some cases, all these tests are performed. However, more or fewer than all these tests could be performed.

Determining whether an instruction is addressed to a runtime file may include, for example, determining whether the instruction is addressed to a cookie file or a temp file.

Embodiment 2

Embodiment 2 is an apparatus as described in embodiment 1, wherein the non-flashable circuitry is further configured to:
determine whether the one or more switch(es) are collectively in a second predetermined position and the data packets or frames contain an instruction of a known file-sharing protocol other than a reading instruction;
discard the data packets or frames when the one or more switch(es) are collectively in the second predetermined position, and the data packets or frames contain the instruction other than the reading instruction; and
transmit the data packets or frames to the system via the second connection when the one or more switch(es) are collectively in the second predetermined position and the instruction is a reading instruction.

Thus, when the one or more switch(es) are collectively in the second position, the apparatus may protect the system from a cyber attack and preserve confidentiality possibly compromised with the use of runtime files.

Again, determining whether the one or more switch(es) are collectively in the second predetermined position may involve determining the position of each of the switches.

Embodiment 3

Embodiment 3 is an apparatus as described in embodiments 1 or 2, wherein the non-flashable circuitry is further configured to:
determine whether the one or more switch(es) are collectively in another predetermined position; and
transmit all the data packets or frames to the system via the second connection when the one or more switch(es) are collectively in the other predetermined position.

Thus, when the one or more switch(es) are collectively in the other position, the apparatus transmits all the data packets or frames, allowing the downloading of files on the system, among other actions.

Embodiment 4

Embodiment 4 is an apparatus as described in any of embodiments 1 to 3, wherein the non-flashable circuitry is further configured to:
receive other data packets or frames from the system via the second connection, and
transmit the other data packets or frames to the public or private network via the first connection or via a third connection provided on the enclosure and connected to the non-flashable circuitry.

Thus, the apparatus transmits all the data packets or frames originating from the system.

Embodiment 5

Embodiment 5 is an apparatus as described in any of embodiments 1 to 4 wherein the non-flashable circuitry is further configured so that one or both of the first connection and the second connection interface(s) directly with the Internet, such as with the use of forward facing to internet code.

Embodiment 6

Embodiment 6 is an apparatus as described in any of embodiments 1 to 5, wherein the first and second connections are wired or wireless connections.

Embodiment 7

Embodiment 7 is an apparatus as described in any of embodiments 1 to 6, wherein the one or more switch(es) are mounted on the enclosure.

Embodiment 8

Embodiment 8 is a method of providing protection for a system connected to a private or public network. The method comprises the step of providing the apparatus of any of embodiments 1 to 7. The method further comprises the steps of connecting the non-flashable circuitry to the private or public network via the first connection, connecting the non-flashable circuitry to the system via the second connection, and receiving data packets or frames from the private or public network via the first connection.

Embedded firmware causes the non-flashable circuitry to discard the data packets or frames when the one or more switch(es) are collectively in the first predetermined position, the data packets or frames contain the instruction other than the reading instruction, and the instruction is not addressed to a runtime file. The embedded firmware also causes the non-flashable circuitry to transmit the data packets or frames to the system via the second connection when the one or more switch(es) are collectively in the first predetermined position and the instruction is addressed to a runtime file.

Embodiment 9

Embodiment 9 is a method as described in any of embodiments 1 to 8, wherein the embedded firmware causes the non-flashable circuitry to discard the data packets or frames when the one or more switch(es) are collectively in the second predetermined position and the data packets or frames contain the instruction other than the reading instruction. The embedded firmware also causes the non-flashable circuitry to transmit the data packets or frames to the system via the second connection when the one or more switch(es) are in the second predetermined position and the instruction is a reading instruction.

Embodiment 10

Embodiment 10 is a method as described in any of embodiments 1 to 9, wherein the embedded software causes the non-flashable circuitry to transmit all the data packets or frames to the system via the second connection when the one or more switch(es) are collectively in another predetermined position.

Embodiment 11

Embodiment 11 is a method as described in any of embodiments 1 to 10, further comprising the step of receiving other data packets or frames from the system via the second connection. The embedded software causes the non-flashable circuitry to transmit the other data packets or frames to the public or private network via the first connection or via a third connection provided on the enclosure and connected to the non-flashable circuitry.

Specific embodiments of the invention are shown by way of examples in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. An apparatus for providing protection for a system connected to a private or public network, comprising:
an enclosure having first and second connections;
one or more switch(es) having at least a first position, a second position, and a third position, wherein the one or more switch(es) are mounted on the enclosure;
non-flashable circuitry located in the enclosure, wherein the non-flashable circuitry is connectable to the private or public network via the first connection and the non-flashable circuitry is connectable to the system via the second connection, and wherein the non-flashable circuitry is configured to:
receive data packets or frames from the private or public network via the first connection; determine whether
the data packets or frames contain an instruction of a known file-sharing protocol other than a reading instruction;
transmit the data packets or frames to the system via the second connection when the data packets or frames do not contain the instruction other than the reading instruction;
determine whether the instruction is addressed to a runtime file, wherein the runtime file is one of a cookie file or a temp file;
determine whether the one or more switch(es) are in the first position, the second position, or the third position;
discard the data packets or frames when the one or more switch(es) are in the first position, and the data packets or frames contain the instruction other than the reading instruction, and the instruction is not addressed to a runtime file;
transmit the data packets or frames to the system via the second connection when the one or more switch(es) are in the first position, and the data packets or frames contain the instruction other than the reading instruction, and the instruction is addressed to a runtime file;
discard the data packets or frames when the one or more switch(es) are in the second position, and the data packets or frames contain the instruction other than the reading instruction;
transmit all the data packets or frames to the system via the second connection when the one or more switch(es) are in the third position;
receive other data packets or frames from the system via the second connection; and
transmit the other data packets or frames to the public or private network via the first connection or via a third connection provided on the enclosure and connected to the non-flashable circuitry.

2. The apparatus of claim 1, wherein the non-flashable circuitry is further configured so that one or both of the first connection and the second connection interface(s) directly with a public or private network.

3. The apparatus of claim 1, wherein the first and second connections are wired or wireless connections.

4. The apparatus of claim 1 wherein the instruction of the known file-sharing protocol other than the reading instruction is one of an instruction to create a file, an instruction to insert data in a file, an instruction to delete a file, an instruction to rename a file, an instruction to update a file, or an instruction to write on a file.

5. The apparatus of claim 4 wherein the known file-sharing protocol is one of the Server Message Block (SMB) protocol, the Network File System (NFS) protocol, or the Apple Filing Protocol (AFP).

6. The apparatus of claim 1 wherein the known file-sharing protocol is one of the Server Message Block (SMB) protocol, the Network File System (NFS) protocol, or the Apple Filing Protocol (AFP).

7. A method of providing protection for a system connected to a private or public network, comprising:
providing an apparatus including: an enclosure having first and second connections; one or more switch(es)

having at least a first position, a second position, and a third position, wherein the one or more switch(es) are mounted on the enclosure;

non-flashable circuitry located in the enclosure, connecting the non-flashable circuitry to the private or public network via the first connection;

connecting the non-flashable circuitry to the system via the second connection;

causing the non-flashable circuitry to receive data packets or frames from the private or public network via the first connection;

causing the non-flashable circuitry to determine whether the data packets or frames contain an instruction of a known file-sharing protocol other than a reading instruction;

causing the non-flashable circuitry to transmit the data packets or frames to the system via the second connection when the data packets or frames do not contain the instruction other than the reading instruction;

causing the non-flashable circuitry to determine whether the instruction is addressed to a runtime file;

causing the non-flashable circuitry to determine whether the one or more switch(es) are in the first position, the second position, or the third position;

causing the non-flashable circuitry to discard the data packets or frames when the one or more switch(es) are in the first position, and the data packets or frames contain the instruction other than the reading instruction, and the instruction is not addressed to a runtime file;

causing the non-flashable circuitry to transmit the data packets or frames to the system via the second connection when the one or more switch(es) are in the first position, and the data packets or frames contain the instruction other than the reading instruction, and the instruction is addressed to a runtime file, wherein the runtime file is one of a cookie file or a temp file;

causing the non-flashable circuitry to discard the data packets or frames when the one or more switch(es) are in the second position, and the data packets or frames contain the instruction other than the reading instruction;

causing the non-flashable circuitry to transmit all the data packets or frames to the system via the second connection when the one or more switch(es) are in the third position;

causing the non-flashable circuitry to receive other data packets or frames from the system via the second connection; and causing the non-flashable circuitry to transmit the other data packets or frames to the public or private network via the first connection or via a third connection provided on the enclosure and connected to the non-flashable circuitry.

8. The method of claim 7, wherein the non-flashable circuitry is configured so that one or both of the first connection and the second connection interface(s) directly with a public or private network.

9. The method of claim 7, wherein the first and second connections are wired or wireless connections.

10. The method of claim 7 wherein the instruction of the known file-sharing protocol other than the reading instruction is one of an instruction to create a file, an instruction to insert data in a file, an instruction to delete a file, an instruction to rename a file, an instruction to update a file, or an instruction to write on a file.

11. The method of claim 10 wherein the known file-sharing protocol is one of the Server Message Block (SMB) protocol, the Network File System (NFS) protocol, or the Apple Filing Protocol (AFP).

12. The method of claim 7 wherein the known file-sharing protocol is one of the Server Message Block (SMB) protocol, the Network File System (NFS) protocol, or the Apple Filing Protocol (AFP).

* * * * *